United States Patent [19]

Saito

[11] Patent Number: 4,637,776

[45] Date of Patent: Jan. 20, 1987

[54] RETAINING STRUCTURE FOR SCREW FASTENING UNIT IN AN ARTICULATED ROBOT

[75] Inventor: Masayuki Saito, Kyoto, Japan

[73] Assignee: Nitto Seiko Co., Ltd., Kyoto, Japan

[21] Appl. No.: 759,069

[22] Filed: Jul. 24, 1985

[51] Int. Cl.$^4$ ............................................. B25J 15/06
[52] U.S. Cl. ................................. 414/744 B; 414/729; 414/627; 414/752; 901/40
[58] Field of Search ....................... 901/14, 15, 16, 17, 901/18, 19, 21, 22, 25, 27, 29, 30, 40, 50; 414/744 R, 744 A, 744 B, 744 C, 749, 751, 752, 753, 729, 730, 627; 403/16, 337, 370; 248/295.1, 188.4, 125

[56] References Cited

U.S. PATENT DOCUMENTS

| | | | |
|---|---|---|---|
| 1,633,837 | 6/1927 | Youtz | 248/295.1 |
| 3,491,496 | 1/1970 | Johnston | 248/188.4 |
| 3,777,902 | 12/1973 | Potter | 414/744 A |
| 4,518,298 | 5/1985 | Yasukawa | 901/16 X |

Primary Examiner—Terrance L. Siemens
Attorney, Agent, or Firm—Koda and Androlia

[57] ABSTRACT

An articulated robot including a vertical rod secured with lockbolts at the end of its arm which is fixed to a screw fastening unit by means of an upper bracket and a lower bracket. The robot further includes a studbolt parallel to the vertical rod at the lower end of the arm. Two nuts are mated with the studbolt to compress the lower bracket. Releasing the lockbolt and rotating the nuts clock-wise or counter-clockwise causes the vertical rod to easily slide to adjust the height of a screw fastening unit from workpieces of different types without having the operator hold the screwing unit by hand.

1 Claim, 4 Drawing Figures

RETAINING STRUCTURE FOR SCREW FASTENING UNIT IN AN ARTICULATED ROBOT

BACKGROUND OF THE INVENTION

1. Field of the Invention

This invention relates to an articulated robot and more particularly to a retaining structure for a screw fastening unit in an articulated robot to be used for loading, unloading and assembling parts in small amounts.

2. Prior Art

These types of articulated robots are becoming more popular in many industrial fields and are utilized in wide applications because of their versatility. Since the robots are used in many applications, various kinds of robots have been developed, one kind of which being especially an articulated robot provided with two horizontal arms. It appears to be more suited for working with a plurality of work stations around it because of the smaller space required for its installation and its larger working area. That is why articulated robots have been utilized in various kinds of jobs. Consequently, it is desired that the robot can be easily adjusted without changing the height of the arm in response to the various kinds of workpieces needed so as to improve its versatility. This desire causes this type of robot to be improved.

Referring to the prior art shown in FIG. 4, an articulated robot includes a primary horizontal arm 2 and a secondary-horizontal arm 3 which respectively make pivotal motions by being controlled by a primary motor 11 and a second motor 22, respectively. The secondary arm 3 has a vertical through hole 46 wherein a vertical rod 26 having at the end a screw fastening unit is inserted and secured with two lockbolts 48 which secure the position. The robot 1 can be adjusted in a position suited for workpieces which are replaced on a work station after the bolts 48 are released and the rod 26 is slid down vertically along the through hole 46 in the secondary arm 3. After the rod 26 is positioned at a desired height, it is secured by the bolts 48 and the screw fastening unit can be fixed to the secondary arm 3 so that it can be used for various work pieces.

In the above prior art, the operator must hold a screw fastening unit 25 when the lockbolts 48 are released in order to slide it up and down with the rod 26 to a certain position. Then, the rod 26 is secured to the secondary arm 3 by screwing the bolts 48. This is, however, an annoying and difficult job to perform. Besides, if the operator is careless the screw fastening unit 25 sometimes falls down and hits a workpiece or the secondary arm 3, resulting in either the fastening unit 25 or the secondary arm 3 being damaged. It also would cause the rod 26 to turn by itself in the through hole 46 because of its inertia forces created when the secondary arm 3 swings at higher speeds and stops at a certain position.

SUMMARY OF THE INVENTION

It is an object of the invention to provide an articulated robot which can be used in various different types of workpieces.

It is another object of the invention to provide an end tool unit of an articulated robot which can be adjusted for various workpieces without altering the height of the arm from the supporting base without hold the end tool unit.

It is a further object of the invention to provide an end tool unit which can be fixed to the secondary arm securely without turning itself in a through hole of the arm when it is positioned.

It is still another object of the present invention to provide an articulated robot which has a lighter secondary arm without a flange portion for securing an end tool unit and which increases the stiffness to prevent the arm from breaking off by twisting at each positioning.

In keeping with the principles of the present invention, the objects of this invention are accomplished by a unique structure for an articulated robot including a secondary arm which has a through hole at the end wherein a vertical rod moves together with an end tool unit connected thereto by means of an upper bracket and a lower bracket. The vertical rod is secured to the secondary arm with bolts and a stud bolt is held with the bottom of the secondary arm extending vertically and parallel to the vertical rod. The stud bolt is also mated with two units to compress the lower bracket.

By means of this structure, each time a different type of workpiece is placed on a work station, the height of an end tool unit from a supporting base for the workpiece can be adjusted by sliding a vertical rod up or down together with the end unit and fixing the vertical rod to a secondary arm after loosening the lockbolts at the end of the arm and a nut to be engaged in a lower bracket. Thus, the vertical rod can be slid along a through hole at the end of the secondary arm and can be secured to the arm with the lockbolts to replace the end tool unit at the height suited to the workpiece. This system can be used for various kinds of workpieces without altering the height of the arms from a supporting base and it is not necessary for an operator to hold the end tool unit.

BRIEF DESCRIPTION OF THE DRAWINGS

The above mentioned features and objects of the present invention will become more apparent with reference to the following description taken in conjunction with the accompanying drawings wherein like reference numerals denote like elements and in which.

DETAILED DESCRIPTION OF THE INVENTION

Figure 1:
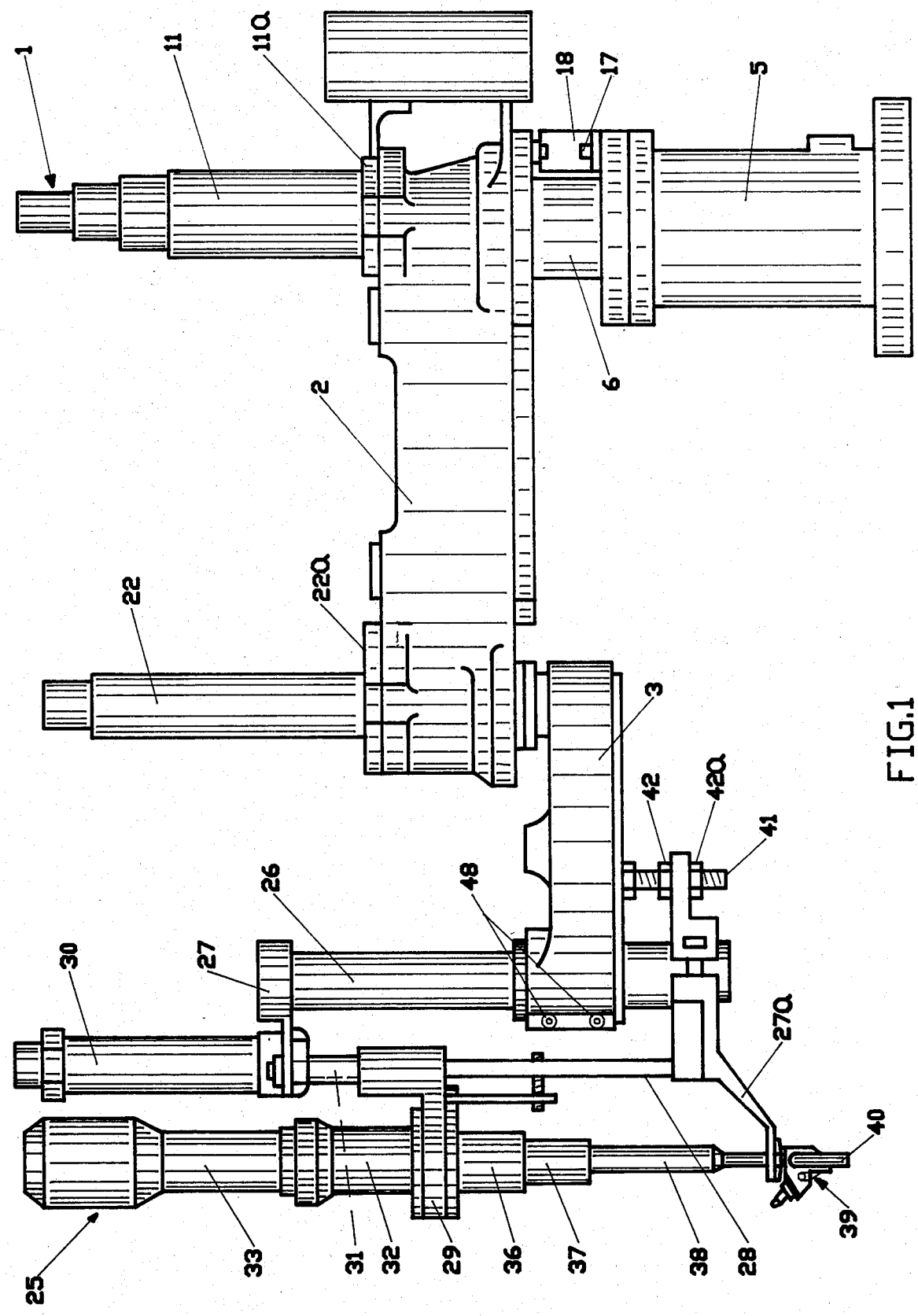
FIG. 1 is an elevational view of an articulated robot.
Figure 2:
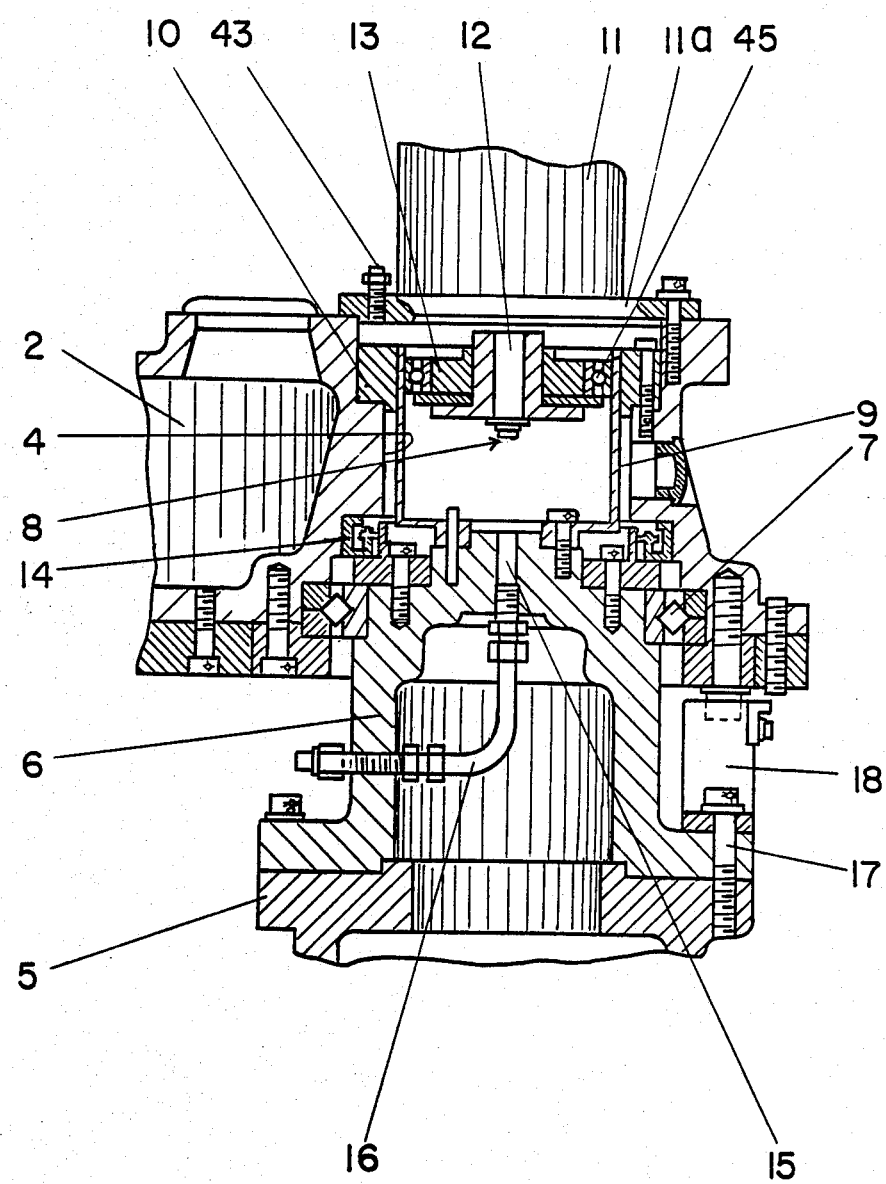
FIG. 2 is a partially enlarged sectional view showing the mounting structure of a first arm on the base.
Figure 3:
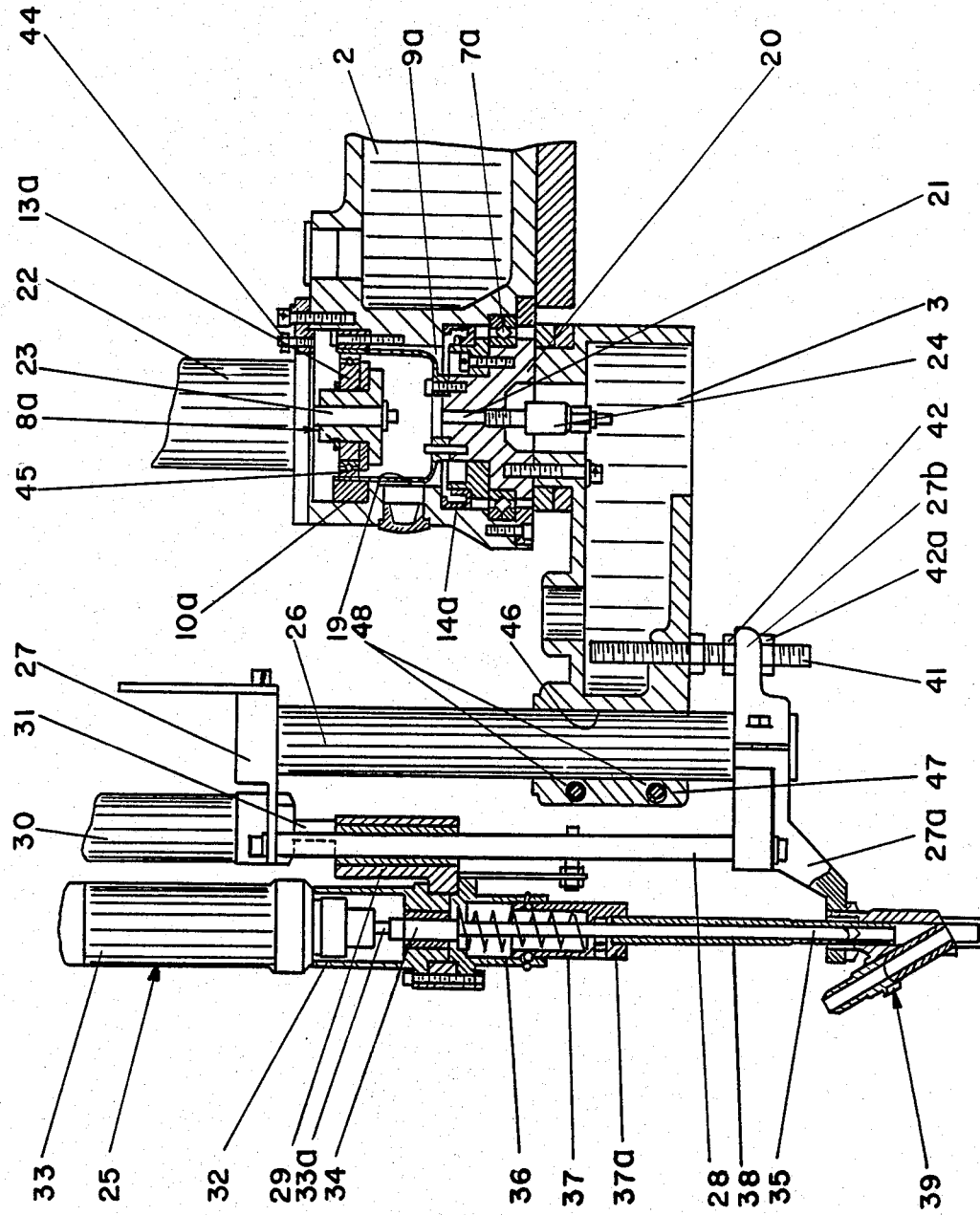
FIG. 3 is a partially enlarged elevational view of a secondary arm of an articulated robot according to this invention.
Figure 4:
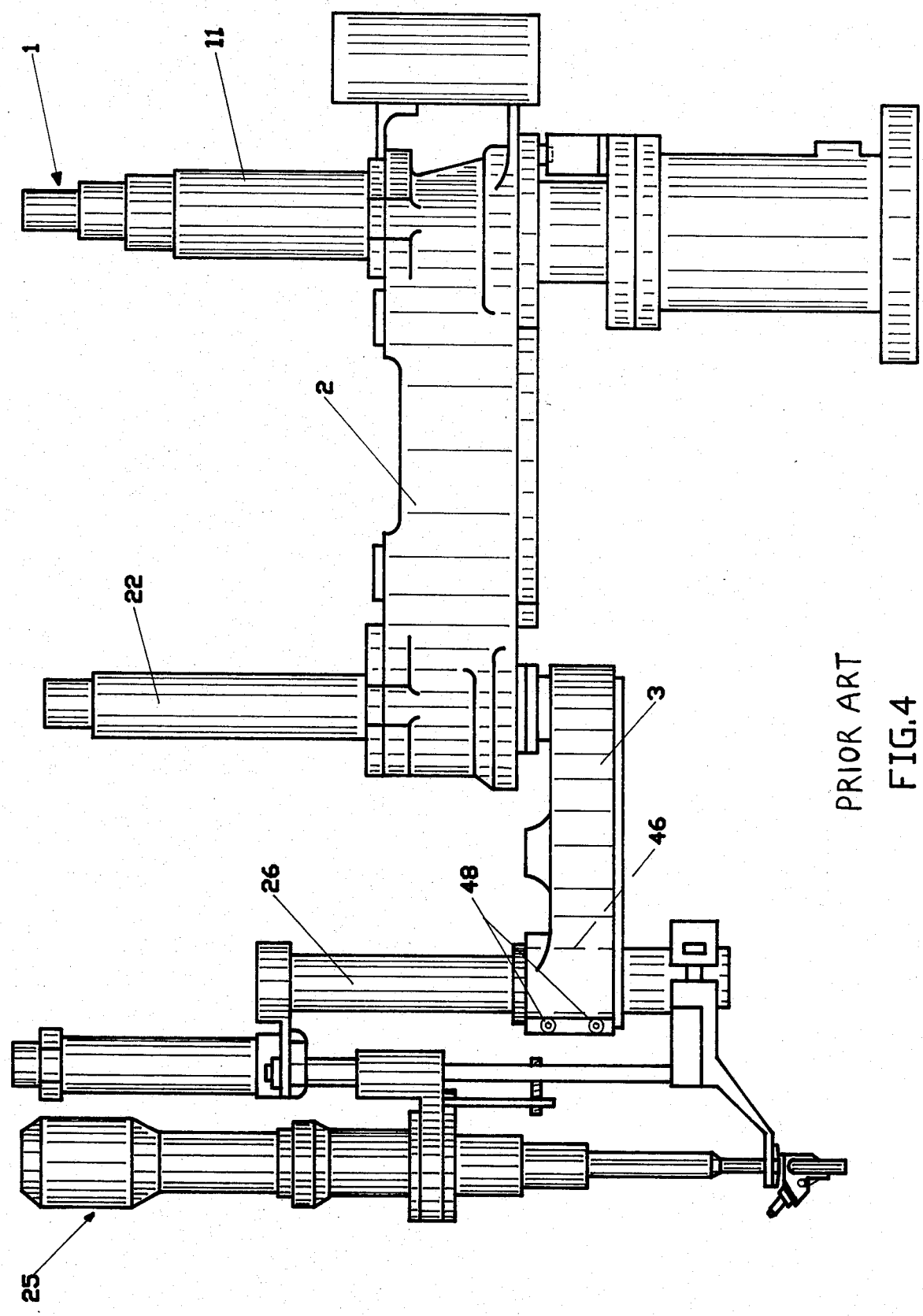
FIG. 4 is an elevational view of a conventional articulated robot.

Referring to an embodiment of the invention illustrated in FIGS. 1 through 3, numeral 1 refers to an articulated robot including a primary arm 2 which has a primary hollow 4 in the shoulder and a secondary arm 3 which is retained at the end of the primary arm 2. The primary arm 2 is installed on a vertical pillar 6 so as to freely pivot around the pillar 6. The pillar 6 is mounted on a supporting base 5 so that the top of the pillar 6 is covered by the shoulder of the arm 2. A cross roller bearing 7, in detail, is provided between the top of the pillar 6 and a lower portion of the arm 2 which forms the primary hollow 4 in order to facilitate the arm 2 to rotate horizontally.

At the top of the pillar 6, a flexible spline 9 of reduction gears 8 is secured and a circular spline 10 is installed to engage it in the hollow 4 of the primary arm 2. Further, a primary motor 11 is attached to a motor case 11a which is secured to the shoulder of the primary arm 2. The motor 11 has a driving shaft 12 connected to a wave generator 13, revolutions of which allow the flexible spline 9 to engage with the circular spline 10. When the primary motor 11 rotates, its rotations can be reduced and transmitted to the primary arm 2. A pulse encoder (not shown) is attached to the top of the motor 11 to check the rotational angles of the primary arm 2.

Between the pillar 6 and the shoulder a hollow area 4 is formed and an oil seal 14 is installed therein. This oil seal 14 prevents oil from leaking when it is applied to the hollow 4 from a primary inlet 43 for lubricating a ball bearing 45, the gears of the flexible spline 9, the circular spline 10 and the generator 13. The pillar 6 has a primary drain 15 in the center which is connected to a primary drain pipe 16 horizontally extending from its side. The outlet of the pipe 16 is closed to keep oil in the hollow 4.

The pillar 6 has a flange at its lower end which sits on a supporting base 5 and is secured by a plurality of lockbolts 17 which are provided the same distance from each adjacent lockbolt. Two of the lockbolts 17 also serve to fix a stopper 18. Both edges of the stopper 18 limit the rotation angle of the primary arm 2.

The primary arm 2 also has a secondary hollow 19 at the end where a shaft 20 attached to the secondary arm 3 is in the upright position and is thus retained to rotate under the primary arm 2. Between the top of the shaft 20 and a lower portion of the arm 2 which forms the secondary hollow 19, a cross roller bearing 7a is installed to facilitate horizontal rotation of the secondary arm 3 with the shaft 20.

Further, a flexible spline 9a with reduction gears 8a is secured to the top of the shaft 20, and a circular spline 10a is installed in the second hollow 19 to engage with it. A secondary motor 22 is attached to a secondary motor case 22a which is secured to the upper end of the primary arm 2. The secondary motor 22 has a driving shaft 23 connected to a wave generator 13a, rotations of which allow the flexible spline 9a to engage the circular spline 10a. When the secondary motor 22 rotates, its rotations can be reduced by the reduction gears and transmitted to the secondary arm 3 by means of the shaft 20. A pulse encoder (not shown) is attached to the top of the secondary motor 22 to check the rotational angles of the secondary arm 3.

Between the shaft 20 and the end of the primary arm 2 which form a secondary hollow 19, an oil seal 14a is installed to prevent oil from leaking from the secondary hollow 19. The oil is filled in the secondary hollow 19 from a secondary inlet 44 for lubricating a ball bearing 45, the gears 8a of the flexible spline 9a, the circular spline 10a and the wave generator 13a. The shaft 20 has a secondary drain 21 in the center connected to a secondary drain pipe 24 which extends vertically from its bottom. The outlet of the drain pipe 24 is located in an opening of the secondary arm 3 and is closed to keep the oil in the secondary hollow 19.

The secondary arm 3 has a vertical through hole 46 at the end which is connected to a slit 47 to be closed by two lockbolts 48. In the through hole 46 is a vertical rod 26 which can be secured at desired position with the bolts 48 crossing the slit 47. The vertical rod 26 retains a screw fastening unit 25, which is an end tool unit, by means of an upper bracket 27 and a lower bracket 27a. The rod 26 has enough length to be slid vertically with the screw fastening unit 25. Between the upper bracket 27 and the lower bracket 27a, two guide shafts 28 (one only is shown) are installed parallel to the rod 26. A driver plate 29 is slidably mounted on these guide shafts 28.

A cylinder 30 is fixed to the upper bracket 27 and a piston rod 31 penetrates the bracket 27. The piston rod 31 is connected to the drive plate 29 so that when the cylinder 30 works, it allows the driver plate 29 to slide up and down along the guide shafts 28. On the driver plate 29, a driver mount 32 is fixed and a third motor 33 is mounted thereon. The third motor 33 has a driving shaft 33a which extends vertically and is connected to a hollow rod 34. The hollow rod 34 is retained to rotate in the driver mount 29 and its lower end is coupled to a driver bit 35.

Under the driver plate 29 a retaining sleeve 36 is attached to retain a vacuum sleeve 37 which extends in the same direction as the driver bit 35. At the top of the vacuum sleeve 37, a vacuum portion 37a is formed to have an opening around the driver bit 35. The vacuum sleeve 37 is coupled to a guide sleeve 38 at the lower end to encase the bit 35 entirely. The lower end of the guide seeve 38 exends to a chuck unit 39, and the guide sleeve 38 slides up and down through it.

The lower bracket 27a also serves to guide longitudinally the guide sleeve 38. Onto the lower end of the bracket 27a is bolted the chuck unit 39. This chuck unit 39 includes a pair of jaws 40 which retain a screw (not shown) to be driven. On the other hand, an adjustable studbolt 41 is held with the lower end of the secondary arm 3 parallel to the vertical rod 26. The studbolt 41 has enough length to be relative to a downward stroke of the rod 26. The lower bracket 27a also has a horizontally enlogated portion 27b on the rear. The elongated portion 27b extends opposite side to the vertical rod 26 and the studbolt 41 penetrates in this elongated portion 27b. The elongated portion 27b is supported and fixed to the bolt 41 by compression of two stop nuts 42 and 42a to be mated with it respectively.

In the articulated robot, structured as above, the lockbolt 48 crossing the slit 47 at the end of a secondary arm 3 are released to meet the type of workpiece placed on a workpiece placed on a work station. The screw fastening unit 25, however, does not fall down because the lower bracket 27a is fixed to the studbolt 41 which is mated with the secondary arm 3. Under this condition the stop nut 42a engaged on the lower side of the bracket 27a is rotated counterclockwise to cause the downward travel of the bracket 27a. As a result, the vertical rod 26 slides down in the through hole 46 of the secondary arm 3 and also the screw fastening unit 25 having a chuck unit 39 moves down. When the chuck unit 39 is positioned at the proper position, the stop nut 42 engaged on the upper side of the bracket 27a is rotated in the same direction as the stop nuts 42a and two stop nuts 42 and 42a press the bracket 27a to be fixed to the studbolt 41. Then the lockbolts 48 are screwed to fix the vertical rod 26 to the end of the secondary arm 3.

When the screw fastening unit 25 is moved up in accordance with different types of workpieces, the height adjustment of the screw fastening unit 25 can be done without supporting it in the way as mentioned above.

I claim:

1. An articulated robot including a first arm, a second arm which is mounted on said first arm, controlled by motors, respectively, and an end tool unit slidably fixed to the top of the secondary arm by means of a stud bolt and nuts to be mated with it, wherein said secondary arm has an end portion which forms a vertical through hole in which a vertical rod is slidably secured at a predetermined position by lock bolts, said end tool unit is secured to the vertical rod by means of an upper bracket and a lower bracket, said lower bracket being compressed by said pair of stop nuts to be mated with an adjustable stud bolt which is fixed to bottom of the secondary arm parallel to said vertical rod, whereby the height of the top of the end tool unit for different work pieces can be changed without changing the height of the arms from a supporting base.

* * * * *